United States Patent
Tanaka

(10) Patent No.: US 9,592,645 B2
(45) Date of Patent: Mar. 14, 2017

(54) TIRE VULCANIZATION FORMING MOLD

(75) Inventor: Tatsumi Tanaka, Hashima (JP)

(73) Assignees: FUJI SHOJI CO., LTD., Hashima-shi (JP); FUJI SEIKO CO., LTD., Hashima-shi (JP)

( * ) Notice: Subject to any disclaimer, the term of this patent is extended or adjusted under 35 U.S.C. 154(b) by 603 days.

(21) Appl. No.: 14/114,796

(22) PCT Filed: Jun. 11, 2012

(86) PCT No.: PCT/JP2012/064943
§ 371 (c)(1),
(2), (4) Date: Oct. 30, 2013

(87) PCT Pub. No.: WO2013/015030
PCT Pub. Date: Jan. 31, 2013

(65) Prior Publication Data
US 2014/0084512 A1   Mar. 27, 2014

(51) Int. Cl.
*B29D 30/06*   (2006.01)
*B29C 33/30*   (2006.01)
*B29C 33/42*   (2006.01)

(52) U.S. Cl.
CPC ........ *B29D 30/0606* (2013.01); *B29C 33/306* (2013.01); *B29C 33/424* (2013.01); *B29D 2030/0613* (2013.01)

(58) Field of Classification Search
CPC ............ B29D 30/0606; B29D 30/0629; B29D 2030/0613; B29C 33/306; B29C 33/424
See application file for complete search history.

(56) References Cited

U.S. PATENT DOCUMENTS

| 5,234,326 A | 8/1993 | Galli et al. |
| 5,327,953 A * | 7/1994 | Ichiki ................. B29D 30/0606 152/209.25 |
| 8,215,939 B2 * | 7/2012 | Takagi ............... B29D 30/0606 425/195 |

(Continued)

FOREIGN PATENT DOCUMENTS

| JP | 8 2211 | 1/1996 |
| JP | 2618198 | 3/1997 |

(Continued)

OTHER PUBLICATIONS

International Search Report Issued Aug. 7, 2012 in PCT/JP12/064943 Filed Jun. 11, 2012.

(Continued)

*Primary Examiner* — James Mackey
(74) *Attorney, Agent, or Firm* — Oblon, McClelland, Maier & Neustadt, L.L.P.

(57) ABSTRACT

A tire vulcanization forming mold and a tire manufacturing method using the same. In the forming mold, a plurality of segment blocks divided in a circumferential direction are equal in circumferential length and are formed with tread forming patterns of plural kinds on which blades for forming tread patterns on a tire are arranged in different arrays. The segment blocks formed with the tread forming patterns of the plural kinds are arranged randomly in the circumferential direction to constitute the mold of a ring shape covering a whole circumference of the tire.

2 Claims, 9 Drawing Sheets

(56) References Cited

U.S. PATENT DOCUMENTS

| | | | |
|---|---|---|---|
| 8,641,950 B2 * | 2/2014 | Ohara | B29D 30/0606 152/209.2 |
| 2011/0183022 A1 | 7/2011 | Takagi et al. | |

FOREIGN PATENT DOCUMENTS

| | | |
|---|---|---|
| JP | 9 309114 | 12/1997 |
| JP | 3226560 | 8/2001 |
| JP | 2005 161609 | 6/2005 |
| JP | 2006 247921 | 9/2006 |
| JP | 2008-105284 A | 5/2008 |
| WO | 2010 047162 | 4/2010 |

OTHER PUBLICATIONS

Japanese Office Action issued Apr. 19, 2016 in Patent Application No. 2013-525618.

* cited by examiner

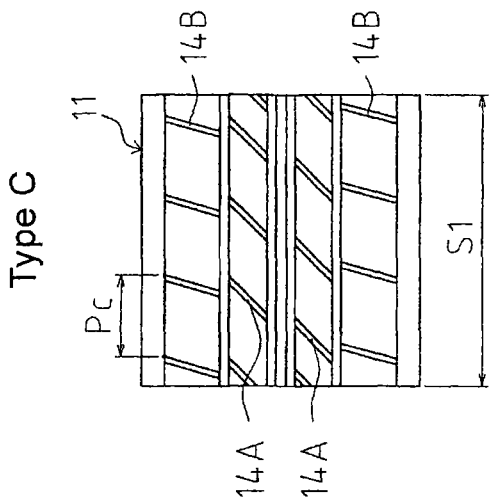
FIG. 5(a) Type A
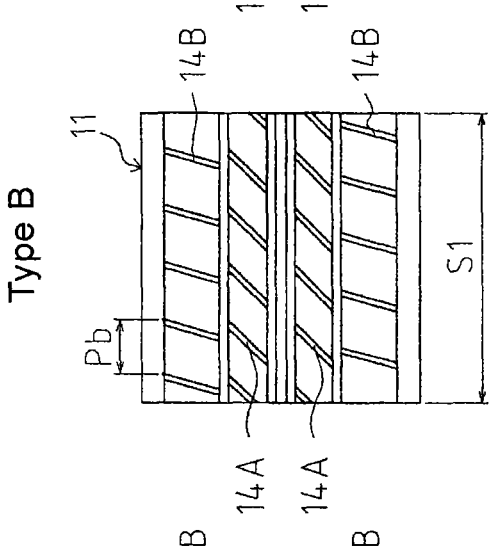
FIG. 5(b) Type B
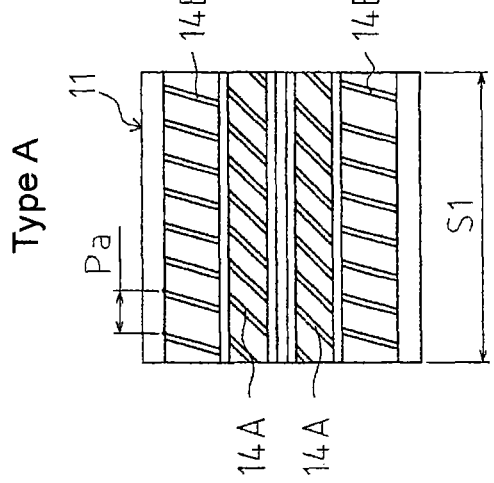
FIG. 5(c) Type C

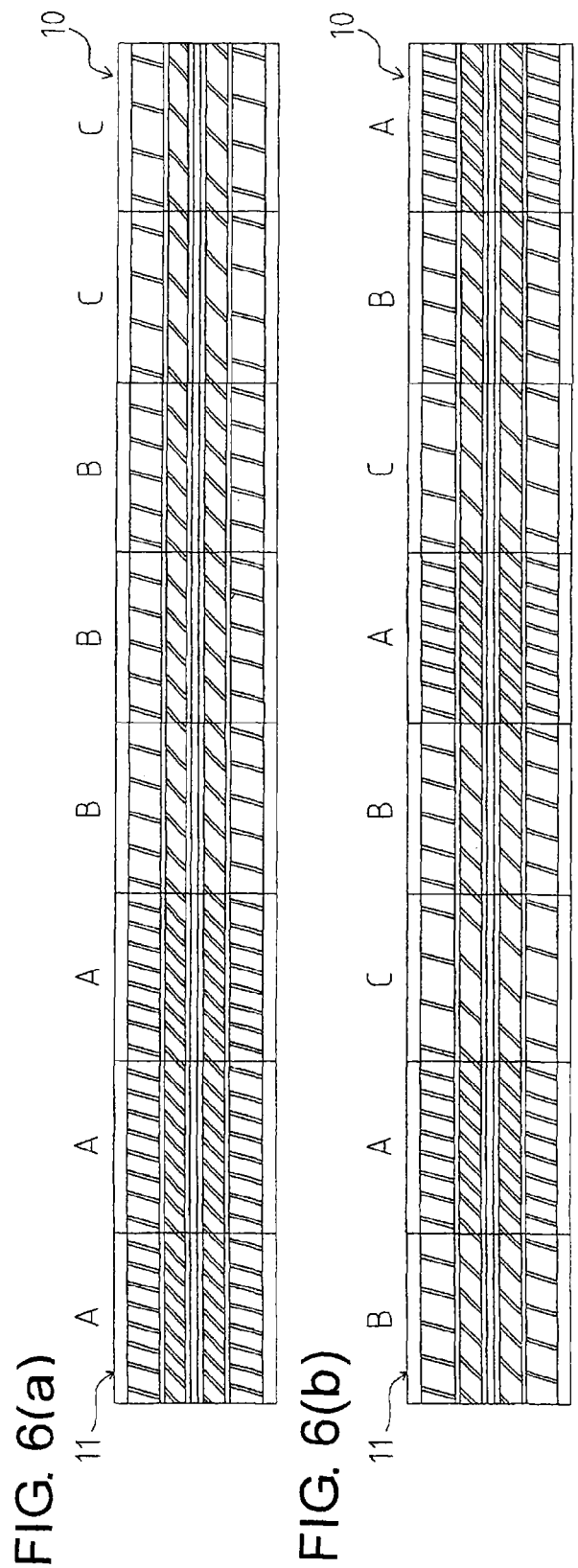

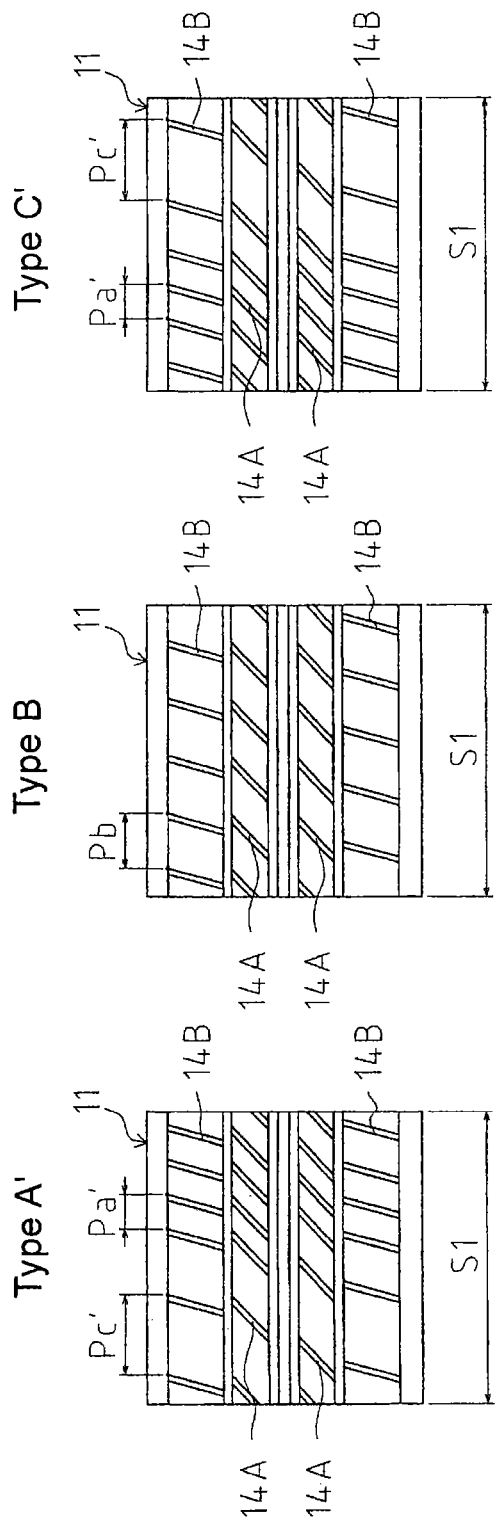

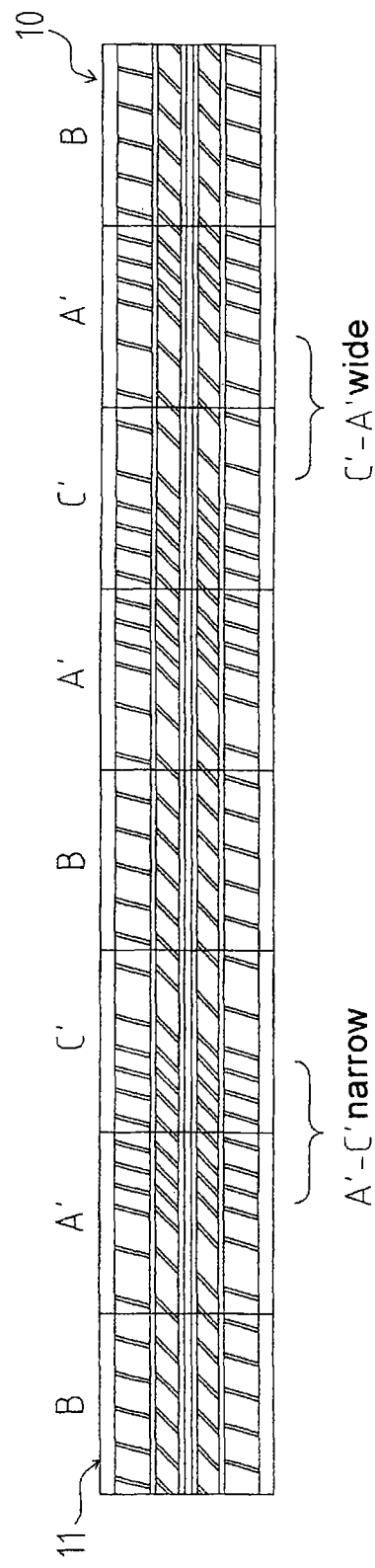
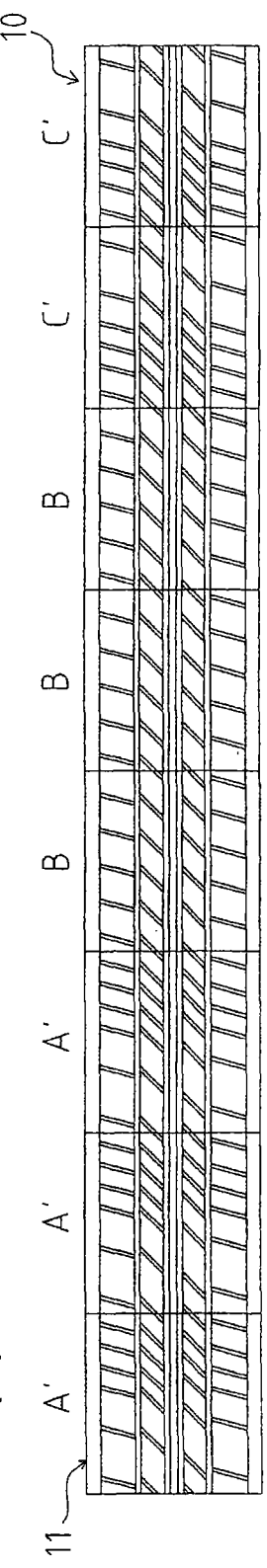
FIG. 9(a)
FIG. 9(b)

TIRE VULCANIZATION FORMING MOLD

TECHNICAL FIELD

The present invention relates to a tire vulcanization forming mold comprising a plurality of segment blocks which are divided in the circumferential direction for forming tread patterns on a tire, and a tire manufacturing method using the blocks.

BACKGROUND ART

In forming a tire, there is used a mold which applies a pressure to the inside of a formed green tire and brings the outer surface of the green tire into pressure contact with the inner wall of the heated mold to vulcanize the green tire with heat and under pressure. On the internal surface side of such a mold (on a tread side of the tire), a plurality of narrow belt-like protrusions and blades are provided for forming a tread pattern on the tire. Usually, the mold is divided into a plural number (for example, eight segments) in the circumferential direction.

In the prior art, for example, Patent Document 1 describes one which is designed to decrease the tire noise by being partitioned into predetermined lengths in the circumferential direction of a tire and arranging tread pattern units of plural kinds randomly in the circumferential direction. In the one described in such Patent Document 1, the tread pattern units of the plural kinds which differ in circumferential length are arranged randomly in the circumferential direction to form the tire tread.

PRIOR ART DOCUMENT

Patent Document

Patent Document 1: JP 2618198 B

SUMMARY OF THE INVENTION

Problem to be Solved by the Invention

However, in the one described in Patent Document 1, the tread pattern units of the plural kinds differing in circumferential length are arranged randomly in the circumferential direction, and thus, after the tread pattern units of the plural kinds are arranged in the circumferential direction, it is possible to mutually replace the arrangement positions of the tread pattern units within the combination, but it is impossible as matter of fact to arrange pattern units being B or C in circumferential length in place of pattern units being A in circumferential length because of the difference in circumferential length. Therefore, restrictions arise in arranging the pattern units.

The present invention has been made taking the foregoing problem in the prior art into consideration, and an object thereof is to provide a tire vulcanization forming mold which is capable of forming tread patterns of plural kinds by circumferentially randomly arranging segment blocks that are used for forming tread patterns of plural kinds, and a tire manufacturing method using the mold.

Solution to the Problem

In order to solve the foregoing problem, the feature of the invention according to a first aspect resides in a tire vulcanization forming mold comprising a plurality of segment blocks divided in a circumferential direction, wherein the segment blocks are equal in circumferential length and are formed with tread forming patterns of plural kinds in which blades for forming tread patterns on a tire are arranged in different arrays and wherein the segment blocks formed with the tread forming patterns of the plural kinds are arranged randomly in the circumferential direction to construct the mold of a ring shape covering the whole circumference of the tire.

The feature of the invention according to a second aspect resides in that in the first aspect, the segment block is composed of a plurality of block pieces divided into a plural number in a width direction and that these block pieces are detachably joined by bolts.

The feature of the invention according to a third aspect resides in that in the first or second aspects, the segment blocks are formed with the tread forming patterns of plural kinds which differ in the intervals of the blades in the circumferential direction.

The feature of the invention according to a fourth aspect resides in a tire manufacturing method, wherein there are provided a plurality of segment blocks divided in a circumferential direction; wherein these segment blocks are equal in circumferential length and are formed with tread forming patterns of plural kinds in which blades for forming tread patterns on a tire are arranged in different arrays; wherein the plurality of segment blocks having these different tread forming patterns are arranged randomly in the circumferential direction in a tire vulcanization forming apparatus; and wherein an unvulcanized tire is loaded in the plurality of segment blocks and is vulcanized and formed.

Effects of the Invention

In the invention constructed above according to the first aspect, the plurality of segment blocks divided in the circumferential direction are equal in circumferential length and are formed with the tread forming patterns of the plural kinds in which the blades for forming the tread patterns on a tire are arranged in the different arrays, and the segment blocks formed with the tread forming patterns of the plural kinds are arranged randomly in the circumferential direction to construct the mold of the ring shape covering the whole circumference of the tire.

With this construction, by having respective plural numbers of the segment blocks of the plural kinds differing in kind prepared as molds used in vulcanizing and forming tires of the same diameter, it is possible to arrange the segment blocks of the different kinds randomly in the circumferential direction and to vulcanize and form tires. In addition, by replacing the segment blocks of the different kinds as desired thereafter, it is possible to vulcanize and form tires having different tread patterns.

Therefore, by, using the segment blocks of a small number, it is possible to vulcanize and form tires of plural kinds differing in tread pattern, as desired and easily. This makes it possible to reduce the cost required for the manufacturing molds and also to reduce the storage space for storing the molds (segment blocks).

In the invention according to the second aspect, the segment block is composed of the plurality of block pieces divided into the plural number in the width direction, and these block pieces are detachably joined by the bolts. Thus, when some of the block pieces are damaged, replacement can be done with only the block pieces damaged or so after the fastening bolts are loosened. Therefore, the running cost for the molds can be reduced in comparison with the case where the segment blocks are replaced on a block-by-block basis.

In the invention according to the third aspect, since the segment blocks are formed with the tread forming patterns of the plural kinds which differ in the intervals of the blades in the circumferential direction, it is possible to arrange the segment blocks differing in the interval of the blades, randomly in the circumferential direction.

In the invention according to the fourth aspect, the plurality of segment blocks divided in the circumferential direction are equal in circumferential length and are formed with the tread forming patterns of the plural kinds in which the blades for forming tread patterns on a tire are arranged in the different arrays, the plurality of segment blocks having these different tread forming patterns are arranged randomly in the circumferential direction in the tire vulcanization forming apparatus, and an unvulcanized tire is loaded in the plurality of segment blocks and is vulcanized and formed. Therefore, by using the segment blocks of a small number, it is possible to realize the tire manufacturing method which is capable of vulcanizing and forming ties of plural kinds differing in tread pattern, as desired and easily.

BRIEF DESCRIPTION OF THE DRAWINGS

FIGS. 5(a)-5(c) are expansion plans showing tread forming patterns of three kinds formed on the segment blocks.

FIGS. 6(a) and 6(b) are expansion plans showing the state that the tread forming patterns of three kinds are arranged randomly.

FIGS. 8(a)-8(c) are views showing tread forming patterns according to a third embodiment of the present invention.

FIGS. 9(a) and 9(b) are expansion plans showing tread forming patterns according to the third embodiment of the present invention.

EMBODIMENTS FOR PRACTICING THE INVENTION

Figure 1:
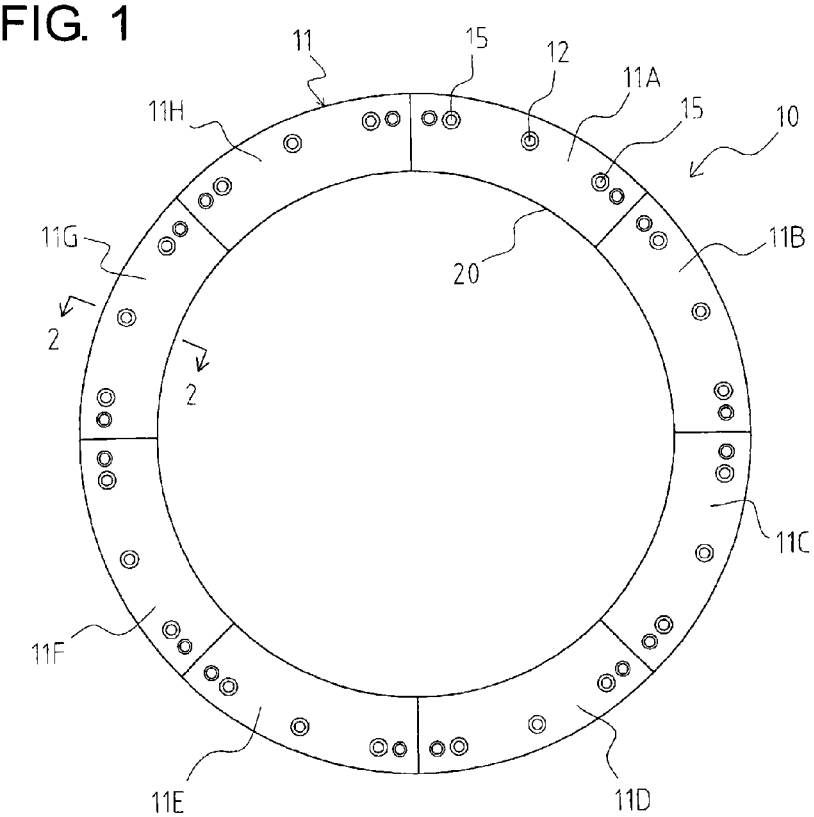
FIG. 1 is a view showing a tire vulcanization forming mold in a first embodiment of the present invention.

Hereafter, a first embodiment of the present invention will be described with reference to the drawings. FIG. 1 shows a vulcanization forming mold 10 for forming tread patterns on a tire through a vulcanization forming, and the mold 10 is composed of segment blocks 11 (11A-11H) which are divided into a plural number (eight in the embodiment) in the circumferential direction. The respective segment blocks 11A-11H have the same division angle, in other words, the same circumferential length.

Figure 2:
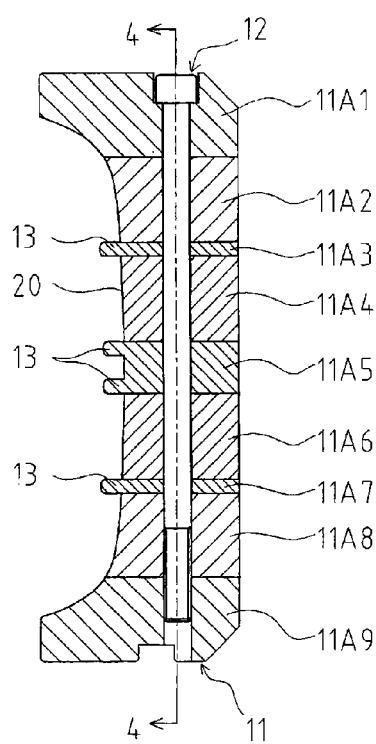
FIG. 2 is a sectional view of segment blocks taken along the line 2-2 in FIG. 1.

As shown in FIG. 2, each segment block 11 divided in the circumferential direction is also divided into a plurality of block pieces 11A1-11A9 in the width direction (tire width direction), and these plural block pieces 11A1-11A9 are bodily joined by fastening blocks 12 to be detachable.

Specifically, each segment block 11 divided in the circumferential direction is composed of opposite end block pieces 11A1, 11A9 for forming opposite end wall portions of the tire, three circumferential groove forming block pieces 11A3, 11A5, 11A7 for forming circumferential grooves on the outer periphery of the tire, and four tread forming block pieces 11A2, 11A4, 11A6, 11A8 for forming a tread pattern on the outer periphery of the tire.

Between the opposite end block pieces 11A1 and 11A9, the circumferential groove forming block pieces 11A3, 11A5, 11A7 are arranged with spaces in the width direction, and a plurality of narrow belt-like protrusions 13 for forming a plurality of circumferential grooves on the outer periphery of the tire are formed on the respective internal surfaces of these block pieces 11A3, 11A5, 11A7. The tread forming block pieces 11A2, 11A4, 11A6, 11A8 are arranged in respective spaces between the circumferential groove forming block pieces 11A3, 11A5, 11A7 and the opposite end block pieces 11A1, 11A9, and a plurality of blades 14 (refer to FIG. 3) for forming the tread pattern are formed on each internal surface of the block pieces 11A2, 11A4, 11A6, 11A8.

Figure 3:
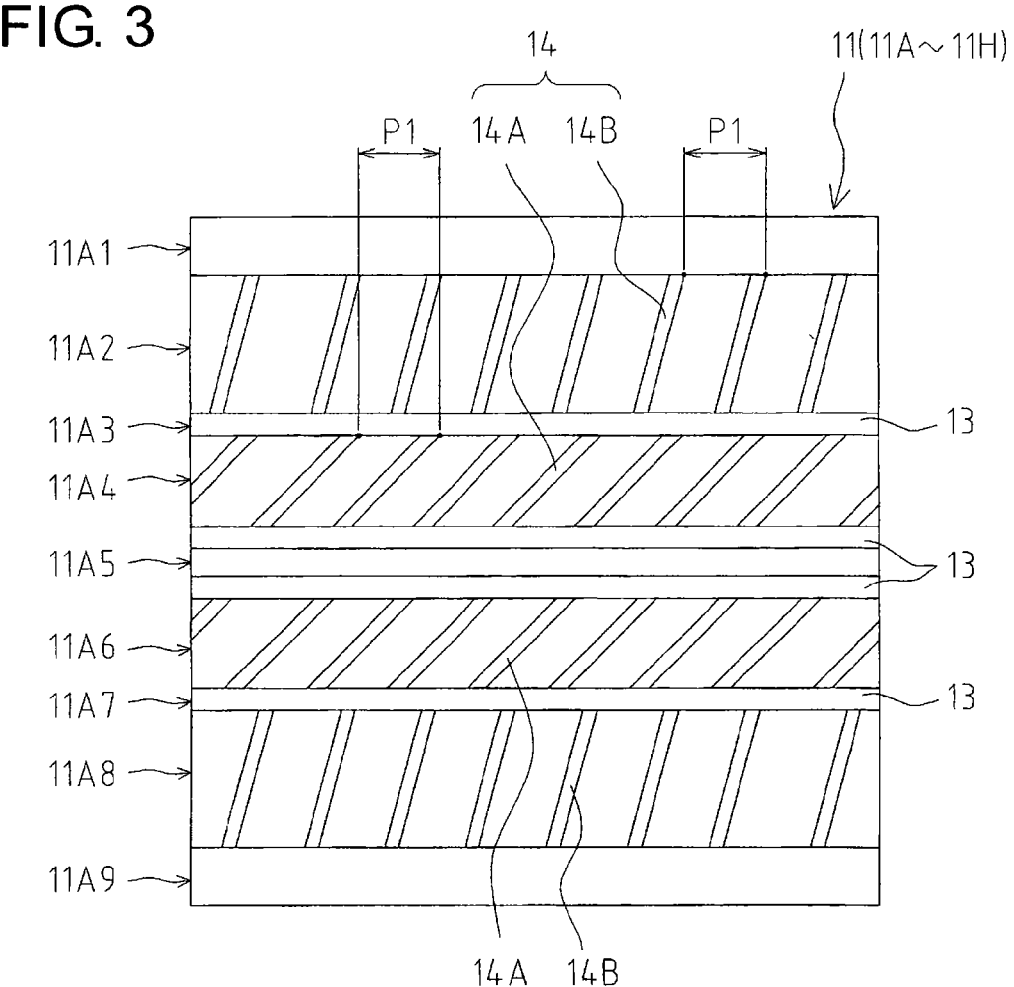
FIG. 3 is a view showing one example of tread forming surfaces of the segment blocks.

In the embodiment, as shown in FIG. 3, first blades 14A extending in a direction crossing the narrow belt-like protrusions 13 are formed on the tread forming block pieces 11A4, 11A6 of the pair residing on the center side in the width direction. The first blades 14A are inclined through a predetermined angle with respect to the width direction and are arranged at a fixed pitch interval (P1) in the circumferential direction. Further, second blades 14B extending in a direction crossing the narrow belt-like protrusions 13 are formed on the tread forming block pieces 11A2, 11A8 of the pair residing on the opposite end sides in the width direction. The second blades 14B are gentler in inclination angle than the first blades 14A and are arranged at the same pitch interval (P1) as that of the first blades 14A. In this case, the first blades 14A and the second blades 14B may by arranged at different pitch intervals.

Figure 4:
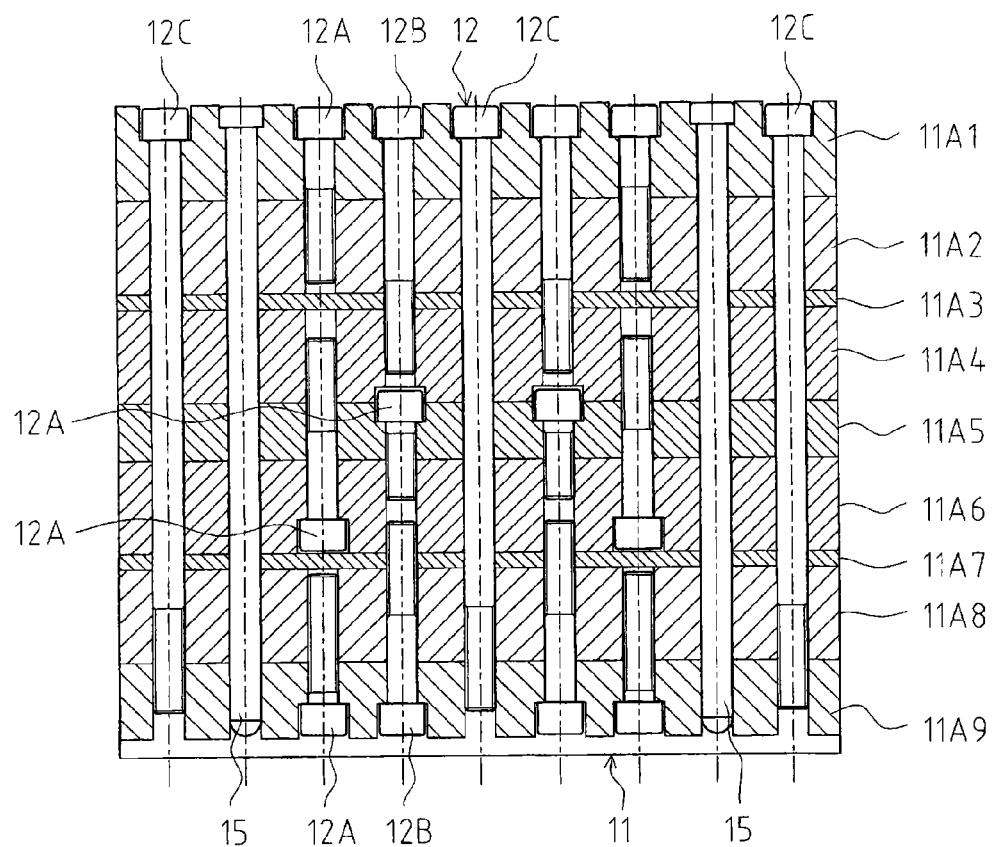
FIG. 4 is a sectional view of the segment block taken along the line 4-4 in FIG. 2.

The plurality of block pieces 11A1-11A9 constituting the segment block 11 are positioned and secured by a pair of knock-pins and a plurality of fastening bolts 12 that pass through the block pieces. To withstand a high pressure during the vulcanization and forming, the fastening bolts 12 for securing the block pieces 11A1-11A9 rigidly join the block pieces 11A1-11A9 in such a manner that as shown in FIG. 4 for example, two or three adjoining block pieces are first joined respectively by a plurality of fastening bolts 12A, the groups of the joined block pieces are further joined with each other by a plurality of different fastening bolts 12B, and finally, all of the block pieces 11A-11A9 are joined by a plurality of fastening bolts 12C that pass through the block pieces 11A-11A9.

Each internal surface of the segment blocks 11A-11H constructed like this represents a tread forming surfaced 20 (refer to FIGS. 1 and 2) of a female mold with a tread pattern to be formed on the tire.

The respective segment blocks 11 (11A-11H) comprise type A, type B type C on which three kinds of tread forming patterns are formed on the tread forming surfaces 20 thereof. FIGS. 5(a)-5(c) show the tread forming patterns of three kinds formed on the segment blocks 11, wherein FIG. 5(a) shows the pattern of the type A, FIG. 5(b) shows the pattern of the type B and FIG. 5(c) shows the pattern of the type C. The segment blocks 11 of these types A-C are set to all have the same dimension S1 in the circumferential length.

The segment block of the type A is smallest in the circumferential interval (Pa) of the first and second blades 14A, 14B, the segment block of the type C is largest in the circumferential interval (Pc) of the first and second blades 14A, 14B, and the segment block of the type B is made to be larger than that of the type A and smaller than that of the type C in the circumferential interval (Pb) (Pa<Pb<Pc). Generally, the tires whose tread pattern is formed by the segment blocks 11 being small in the blade interval can be reduced in noise, whereas the tires whose tread pattern is formed by the segment blocks being large in the blade interval can be increased in gripping force.

The mold 10 of a ring shape covering the tire whole circumference is constructed by arranging the segment blocks 11 of the three kinds including these types A, B and C, randomly in the circumferential direction. Thus, by making different combinations of the types, it is possible to manufacture various kinds of tires which are reduced in noise and increased in gripping force.

For example, as shown in FIG. 6(a), it is possible to construct the ring-like mold 10 covering the tire whole circumference by using three segment blocks 11 of the type A, three segment blocks 11 of the type B and two segment blocks 11 of the type C and by arranging the eight segment blocks 11 in a combination of AAABBBCC to meet a required quality for tires. Alternatively, as shown in FIG. 6(b), it is possible to construct a mold 10 differing in kind by likewise using three of the type A, three of the type B and two of the type C and by arranging these in a combination of BACBACBA. In these instances, because the respective segment blocks 11 are all the same in the circumferential length, the circumferential length of the mold is constant no matter how those of the types A-C are used in combination, so that it is possible to vulcanize and form tires of the same diameter.

Incidentally, where tires are vulcanized and formed by the use of eight segment blocks 11 of three kinds including the types A-C, it becomes possible to manufacture tires of two hundreds sixteen (216) kinds which differ from one another in tread pattern (216=3×3×3×2×2×2×1×1).

It is to be noted that the segment blocks 11 of all of the types are unified in the shape on the both surfaces in the circumferential direction so that the blades 14A (14B) formed on the adjoining segment blocks 11 are regularly continuous without being split into sections even where the segment blocks 11 of the same type or the segment blocks of different types are arranged to be next to each other in the circumferential direction.

That is, as shown in FIGS. 6(a) and 6(b), arrangement is made so that the blade 14 formed on one end surface of one of the adjoining segment blocks 11 and the blade 14 formed on one end surface of the other segment block 11 are continuous with each other. Thus, there does not occur an abrupt change in blade shape at the joining portion between the segment blocks 11.

In vulcanizing and forming tires by using the segment blocks 11A-11H divided into the plural number as described above, the plurality of aforementioned segment blocks 11A-11H are set in a tire vulcanization forming apparatus. In this state, an unvulcanized tire (green tire) to be vulcanized and formed is loaded into the plurality of segment blocks 11A-11H. After the unvulcanized tire is loaded, a bladder is expanded, then the segment blocks 11A-11H are advanced radially inward to the mold closing position, whereby the space for vulcanization is closed tightly. After the segment blocks 11A-11H are advanced to the mold closing position, steam is supplied into the bladder, and the outer peripheral surface of the unvulcanized tire is pressured on the internal surfaces of the segment blocks 11A-11H to have the shapes of the tread forming surfaces 20 transferred thereon that are formed on the internal surfaces of the segment blocks 11A-11H, whereby the tire is vulcanized and formed to have the predetermined tread patterns thereon.

In this vulcanization and forming processing, the gas generated between the outer peripheral surface of the tire and the internal surfaces of the segment blocks 11A-11H is discharged through gaps formed between the joining surfaces of the segment blocks 11A-11H. When a predetermined vulcanization period of time elapses, the segment blocks 11A-11H are retracted radially outward, and then, the bladder is reduced in pressure therein to be contracted. In this state, the vulcanized tire is unloaded from the interior of the mold 10.

Like this, the plurality (eight) of segment blocks 11 arranged randomly in the circumferential direction are configured so that the circumferential lengths thereof are made to be equal and that each blade 14 bridging over adjoining segment blocks 11 is continuous in the circumferential direction without being split. Thus, when the segment blocks 11 of the types A-C differing in tread forming pattern are used in many combinations in the circumferential direction, it is possible to construct the molds 10 of various kinds which are capable of vulcanizing and forming tires of the same diameter. In addition, based on the testing of the tires after the vulcanization and forming, it is possible to arbitrarily replace the segment blocks 11 of the type A in the circumferential direction by the segment blocks 11 of the type B or the type C.

Accordingly, by having respective small numbers of the segment blocks of the types A-C prepared as molds used in vulcanizing and forming tires of the same diameter, it is possible to vulcanize and form various kinds of tires differing in tread pattern. As a consequence, it becomes possible to reduce the cost required for the manufacturing of the molds 10 and also to reduce the storage space for storing the molds 10 (segment blocks 11).

In this instance, the segment blocks 11 are not limited to the three kinds of the types A-C and may be of four kinds, five kinds or more. Further, the division number of the segment blocks 11 constituting the vulcanization and forming mold 10 is not limited to eight in the circumferential direction and may be ten or more or may be an odd number without being limited to an even number.

As described hereinabove, according to the present embodiment, the plurality of segmented blocks 11 (11A-11H) divided in the circumferential direction comprise those which are made to be equal in the circumferential length and which are provided with tread forming patterns of plural kinds on which the blades 14 for forming tread patterns on a tire are arranged in different arrays. Then, since the ring-like mold covering the whole circumference of a tire is constructed by cicumferentially randomly arranging the segment blocks 11 which are formed thereon with these tread forming patterns of the plural kinds, it becomes possible to vulcanize and form tires of plural kinds differing in tread pattern by only having the respective small numbers of the segment blocks 11 of the types A-C prepared as the molds 10 used in vulcanizing and forming tires of the same diameter.

In addition, since the segment blocks 11 having the same length in the circumferential direction can be arranged randomly in the circumferential direction, it is possible to vulcanize and form tires of the same diameter even where, after the testing of vulcanized and formed tires, the segment blocks 11 of, for example, the type A are replaced by the segment blocks of the type B or the type C. As a result, by using the segment blocks 11 being small in number, it is possible to vulcanize and form tires of plural kinds differing in tread pattern, as desired and easily. This makes it possible to reduce the cost required for the manufacturing of molds and also to reduce the storage space for storing the molds (segment blocks).

Moreover, each of the segment blocks 11A-11H is composed of the plurality of block pieces 11A1-11H9. Thus, when the blades 14 or the like on some of the block pieces 11A1-11H9 are damaged, only such some block pieces having been damaged or so can be replaced after the fastening bolts 12 are loosened. Therefore, the running cost for the vulcanization and forming molds 10 can be reduced in comparison with the case where the segment blocks 11 are replaced on a block-by-block basis.

Figure 7:
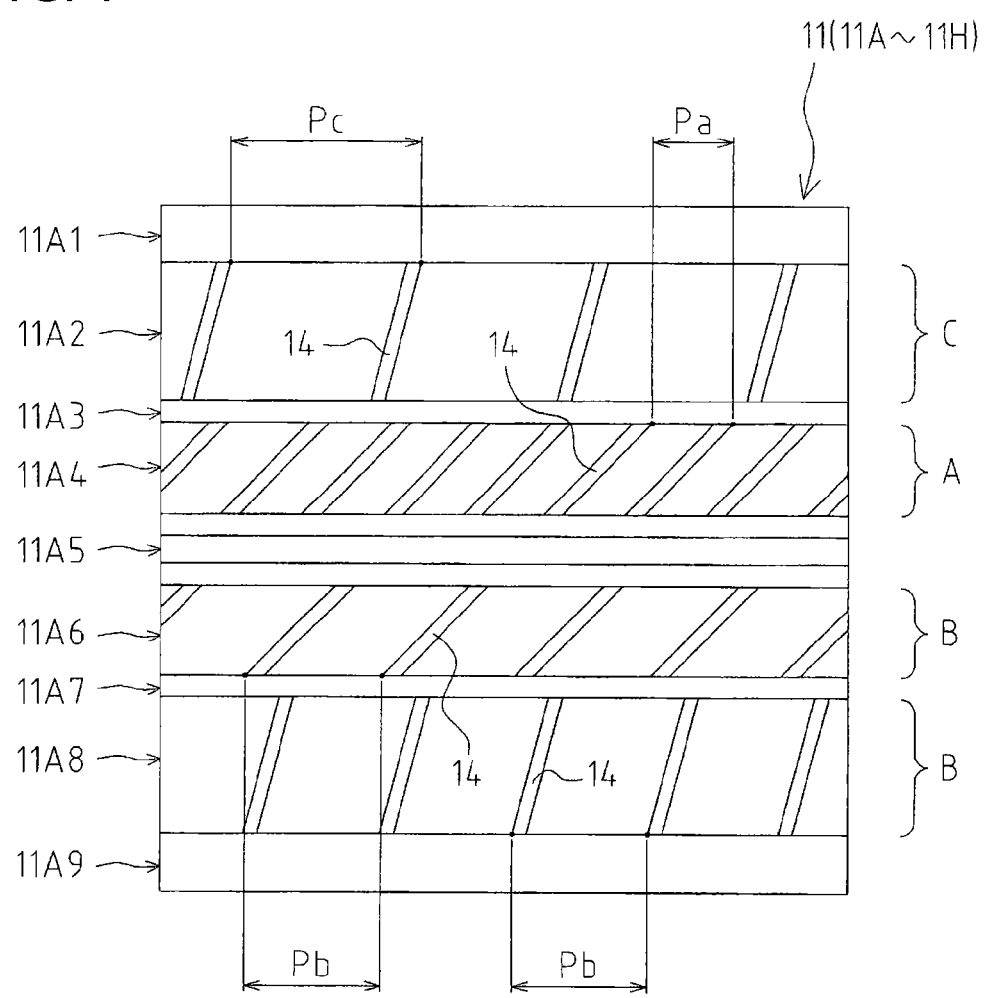
FIG. 7 is a view showing a tread forming pattern according to a second embodiment of the present invention.

FIG. 7 shows a second embodiment of the present invention. Although in the foregoing first embodiment, the same pitch interval is set for the interval of the blades 14 which are formed on the tread forming block pieces 11A2, 11A4, 11A6 and 11A8 composing each segment block 11, block pieces differing in the interval of the blades 14 are combined in the width direction in the second embodiment.

Specifically, in the second embodiment, the block pieces 11A2, 11A4, 11A6 and 11A8 differing in type are arranged randomly also in the width direction of the segment block 11, and FIG. 7 shows one example in which the block piece of the type C, the block piece of the type A, the block piece of the type B and the block piece of the type B are arranged in order from one end side in the width direction.

By arranging the block pieces of the different types randomly in the width direction like this, it is possible to greatly increase the number of the combinations of tread patterns that can be formed on tires, where coupled with the aforementioned first embodiment.

FIGS. 8(a)-8(c) and 9(a) and 9(b) show a third embodiment of the present invention. The respect differing from the first embodiment resides in that as shown in FIGS. 8(a)-8(c), in place of the segment blocks 11 of the type A described in the first embodiment, there are used segment blocks of type A' and that in place of the segment blocks of the type C, there are used segment blocks of type C'. Other respects are the same as the construction described in the first embodiment.

Specifically, the segment block 11 of the type A' takes the construction that the blades 14A, 14B having an interval (Pc') being longer than the interval (Pb) on the segment block 11 of the type B and the blades 14A, 14B having an interval (Pa') being shorter than the interval (Pb) are arrayed to be juxtaposed in the circumferential direction and oriented in one direction. The segment block 11 of the type C' takes the construction that the blades 14A, 14B having an interval (Pa') being shorter than the interval (Pb) on the segment block 11 of the type B and the blades 14A, 14B having the interval (Pc') being longer than the interval (Pb) are arrayed to be juxtaposed in the circumferential direction and oriented in one direction.

Thus, by arranging the segment block 11 of the type A' and the segment block 11 of the type C' to be next to each other as shown in FIG. 9(a), it is possible to form a tread forming pattern being short (narrow) in blade interval between the segment blocks 11. On the contrary, by arranging the segment block 11 of the type C' and the segment block 11 of the type A' to be next to each other, it is possible to form a tread forming pattern being long (wide) in blade interval between the segment blocks 11.

This instance is the same as those of the foregoing embodiments in that the segment blocks 11 of all of the types are unified in the shape of both surfaces in the circumferential direction so that the blades 14A (14B) formed between the adjoining segment blocks 11 are regularly continuous in the circumferential direction without being split.

Further, as shown in FIG. 9(b), by using three segment blocks 11 of the type A', three segment blocks 11 of the type B and two segment blocks of type C' and by arranging these blocks 11 in a combination of, for example, A' A' A' BBBC'C', it is possible to greatly increase the variation control in tread forming pattern.

Figure 10:
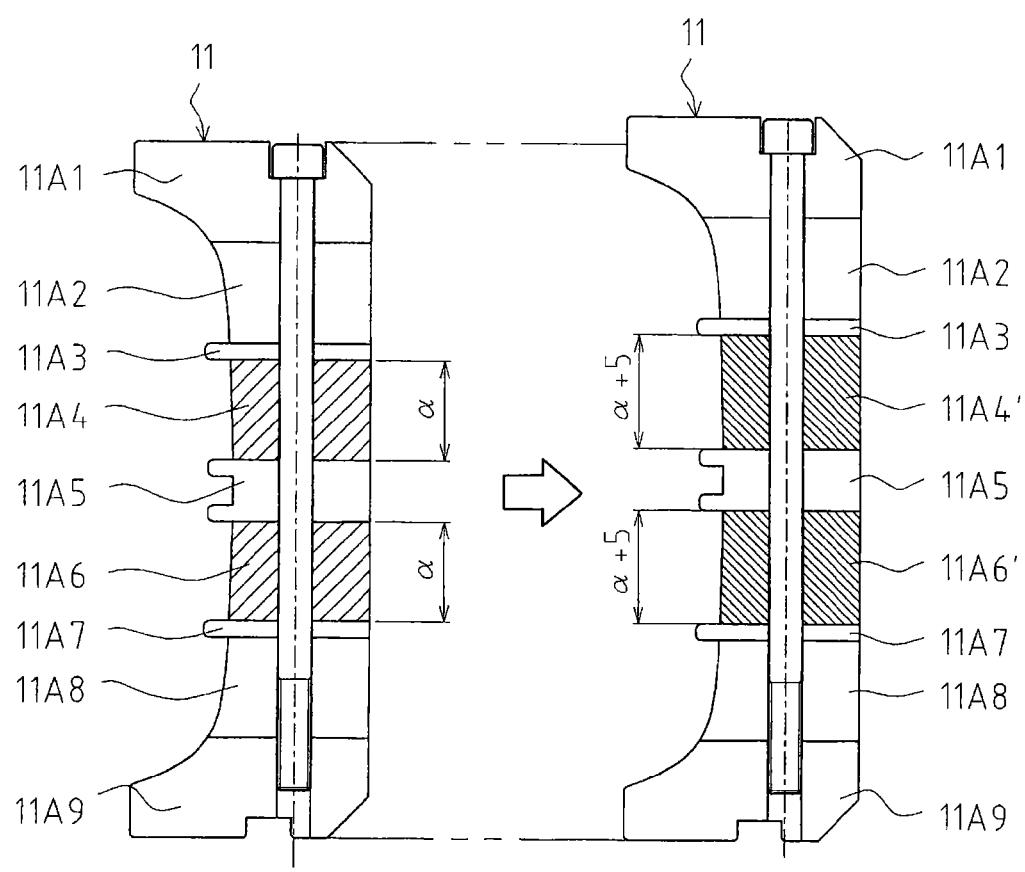
FIG. 10 is a sectional view showing segment blocks according to a fourth embodiment of the present invention.

FIG. 10 shows a fourth embodiment of the present invention. This embodiment is made to be applicable to tires differing in width dimension by taking advantage of the construction that each segment block 11 is divided into the plurality of block pieces 11A1-11A9 in the width direction.

Specifically, as shown in FIG. 10, by replacing the pair of tread forming block pieces 11A4 and 11A6 each with a width dimension a which reside on both sides of the circumferential groove forming block piece 11A5 residing at the center portion in the width direction, by tread forming block pieces 11A4' and 11A6' each with a width dimension α+5, it easily becomes possible to change the vulcanization forming mold 10 for the tire size "215" to one for the tire size "225".

In the foregoing embodiments, each of segment blocks 11A-11H divided in the circumferential direction is configured by the plurality of block pieces 11A1-11A9 divided in the width direction, and thus, at the occurrence of damages or the like on some of the block pieces 11A1-11A9, the replacement can be done with only the damaged block pieces 11A1-11A9. The same effects can be achieved by forming on an internal surface of each segment block 11 a plurality of circumferential grooves at intervals in the width direction (in the width direction of a tire), by detachably fitting arc-shape block pieces in these circumferential grooves, and by fixing the block pieces by fastening bolts.

In the foregoing embodiments, description has been made regarding the examples that each segment block 11 is composed of the plurality of block pieces 11A1-11A9 divided in the width direction. However, it is not an essential requirement for the present invention to divide the segment block 11 into the plurality of block pieces, and each segment block 11 may be constituted as one piece by casting or cutting.

Further, in the foregoing embodiments, each segment block 11 is divided into a predetermined number in the width direction in units of circumferential groove forming block pieces and units of tread forming block pieces. However, how to divide the segment block 11 or how many divisions are to be made is the matter of discretionary choice and is not to be limited to that in the embodiment.

As described above, although having been described based on the embodiments, the present invention is not limited to the construction described in the embodiments and may take various forms without departing from the gist of the present invention as described in the claims.

INDUSTRIAL APPLICABILITY

The tire vulcanization forming mold according to the present invention and the tire manufacturing method using the forming mold are suitable for use in vulcanizing and forming tires by a plurality of segment blocks divided in a circumferential direction.

The invention claimed is:

1. A tire vulcanization forming mold comprising:
a plurality of segment blocks of different kinds divided in a circumferential direction, wherein:
the segment blocks are equal in circumferential length and are formed with tread forming patterns of plural kinds in which blades to form tread patterns on a tire are arranged in different arrays;
each of the segment blocks is formed with opposite end block pieces to form opposite end wall portions of the tire, circumferential groove forming block pieces arranged with spaces in a width direction between the opposite end block pieces, the circumferential groove forming block pieces being formed on internal surfaces thereof with protrusions to form circumferential grooves on an outer periphery of the tire, tread forming block pieces arranged in respective spaces between the circumferential groove forming block pieces and the opposite end block pieces, the tread forming block pieces being formed on internal surfaces thereof with blades arranged in a different array in accordance with the kind of the segment block; and further comprising:
a pair of knock-pins that pass through all of the opposite end block pieces, the circumferential groove forming block pieces and the tread forming block pieces in a width direction,
a plurality of first fastening bolts to secure two or three adjoining block pieces to make groups of the adjoined block pieces,
a plurality of second fastening bolts to join the groups of the adjoined block pieces,
a plurality of third fastening bolts that pass through the opposite end block pieces, the circumferential groove forming block pieces and the tread forming block pieces to fasten all of the pieces, and
the segment blocks formed with the tread forming patterns of the plural kinds are arranged randomly in the circumferential direction to construct the mold of a ring shape covering a whole circumference of the tire.

2. The tire vulcanization forming mold in claim 1, wherein the segment blocks to form the tread patterns differ in intervals of the blades in the circumferential direction according to the kinds of the segment blocks.

* * * * *

UNITED STATES PATENT AND TRADEMARK OFFICE
CERTIFICATE OF CORRECTION

PATENT NO. : 9,592,645 B2
APPLICATION NO. : 14/114796
DATED : March 14, 2017
INVENTOR(S) : Tatsumi Tanaka Page 1 of 1

It is certified that error appears in the above-identified patent and that said Letters Patent is hereby corrected as shown below:

On the Title Page

Item (30), the Foreign Application Priority Data information has been omitted. Item (30) should read:
-- (30) Foreign Application Priority Data
Jul. 27, 2011    (JP) ................................ 2011-163846 --

Signed and Sealed this
Twenty-fourth Day of April, 2018

Andrei Iancu
*Director of the United States Patent and Trademark Office*